(12) United States Patent
Hensel et al.

(10) Patent No.: US 7,418,448 B2
(45) Date of Patent: Aug. 26, 2008

(54) ORGANIZATION STRUCTURE SYSTEM

(75) Inventors: Jeffrey D. Hensel, Fargo, ND (US);
Brian K. Gullickson, Hudson, WI (US);
Jeffrey L. Kamstra, Fargo, ND (US);
Jaroslaw Wyganowski, Fargo, ND (US);
Jeffrey A. Trosen, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 10/780,442

(22) Filed: Feb. 17, 2004

(65) Prior Publication Data

US 2004/0181442 A1 Sep. 16, 2004

Related U.S. Application Data

(60) Provisional application No. 60/454,389, filed on Mar. 12, 2003.

(51) Int. Cl.
*G06F 17/30* (2006.01)
(52) U.S. Cl. .................................... 707/100; 707/1
(58) Field of Classification Search .................. 707/100, 707/1; 715/501.1, 513, 514
See application file for complete search history.

(56) References Cited

U.S. PATENT DOCUMENTS 6,073,138 A * 6/2000 de l'Etraz et al. ........ 707/104.1
6,115,690 A * 9/2000 Wong ............................ 705/7
6,134,706 A * 10/2000 Carey et al. ................. 717/102
6,154,753 A * 11/2000 McFarland .................. 715/508
6,212,530 B1 * 4/2001 Kadlec ......................... 707/201
6,240,415 B1 * 5/2001 Blumberg ....................... 707/9
6,301,574 B1 * 10/2001 Thomas et al. .................. 707/1
6,324,541 B1 * 11/2001 de l'Etraz et al. ......... 707/104.1
6,334,158 B1 * 12/2001 Jennyc et al. ................ 719/328
6,381,579 B1 * 4/2002 Gervais et al. .................. 705/8
6,539,379 B1 * 3/2003 Vora et al. ...................... 707/6

* cited by examiner

*Primary Examiner*—Cheryl Lewis
(74) *Attorney, Agent, or Firm*—Joseph R. Kelly; Westman, Champlin & Kelly, P.A.

(57) ABSTRACT

The present invention is a software system that allows users to model an organizational structure in substantially anyway they wish. The system then provides functionality that allows an administrator to associate users and data to the defined organizational structure, in a flexible way. In one embodiment, an organizational tree component allows the user to configure an organizational tree having nodes corresponding to business units. The business unit nodes are illustratively containers of filters which, themselves, contain filter links. The filter links are links to business entities that are associated with the business unit identified by the node on the organizational tree structure.

8 Claims, 13 Drawing Sheets

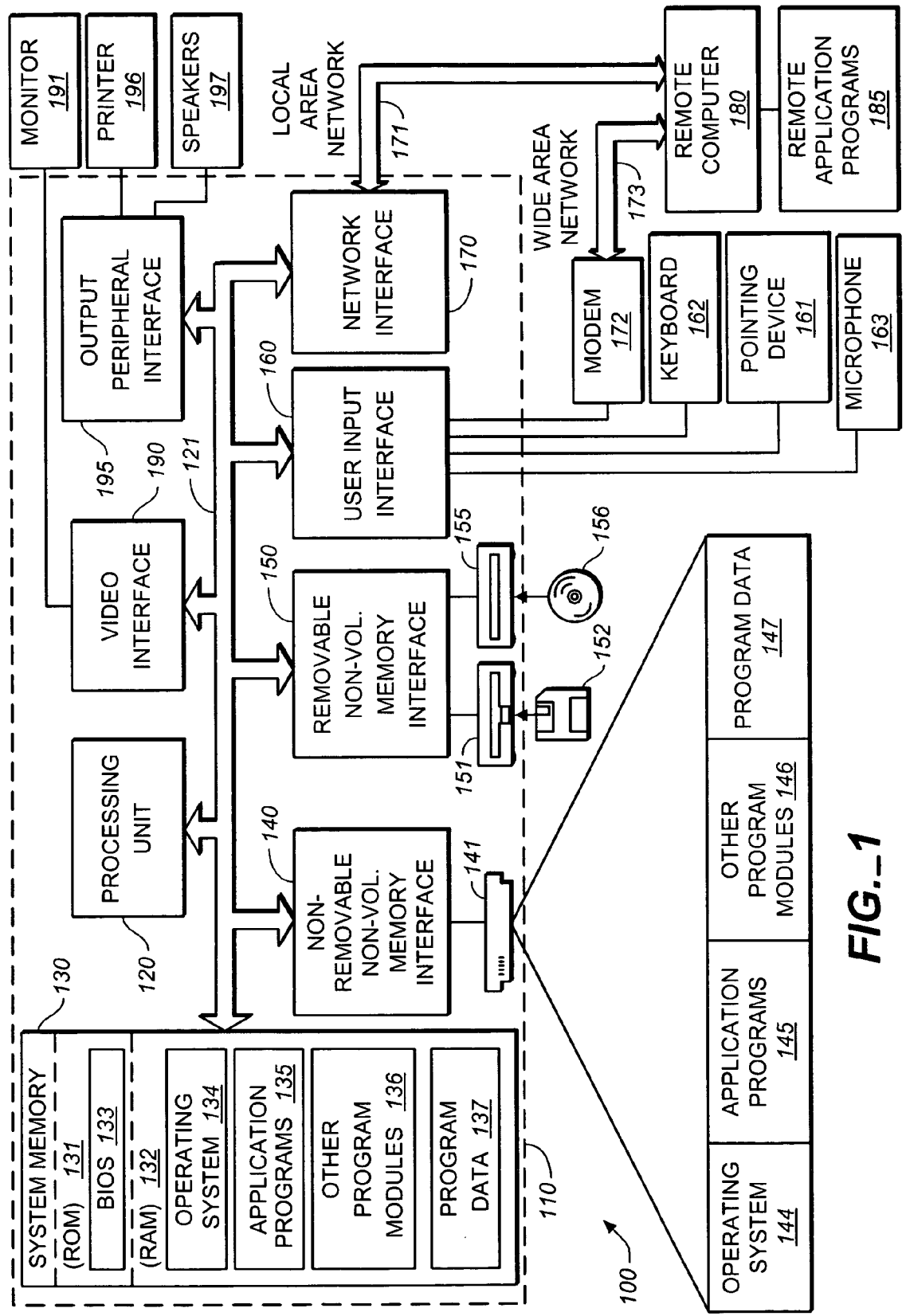
FIG._1

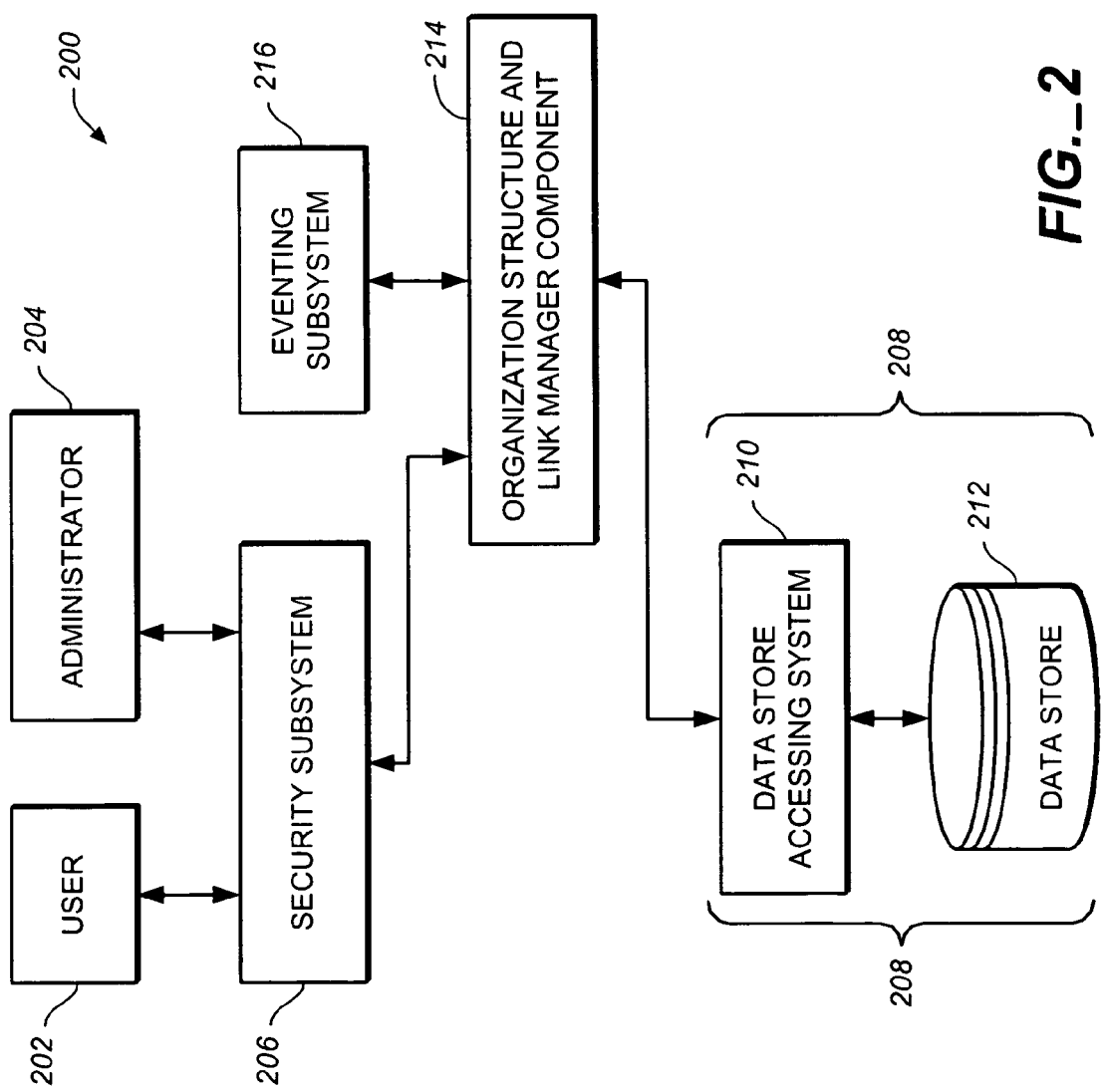
FIG._2

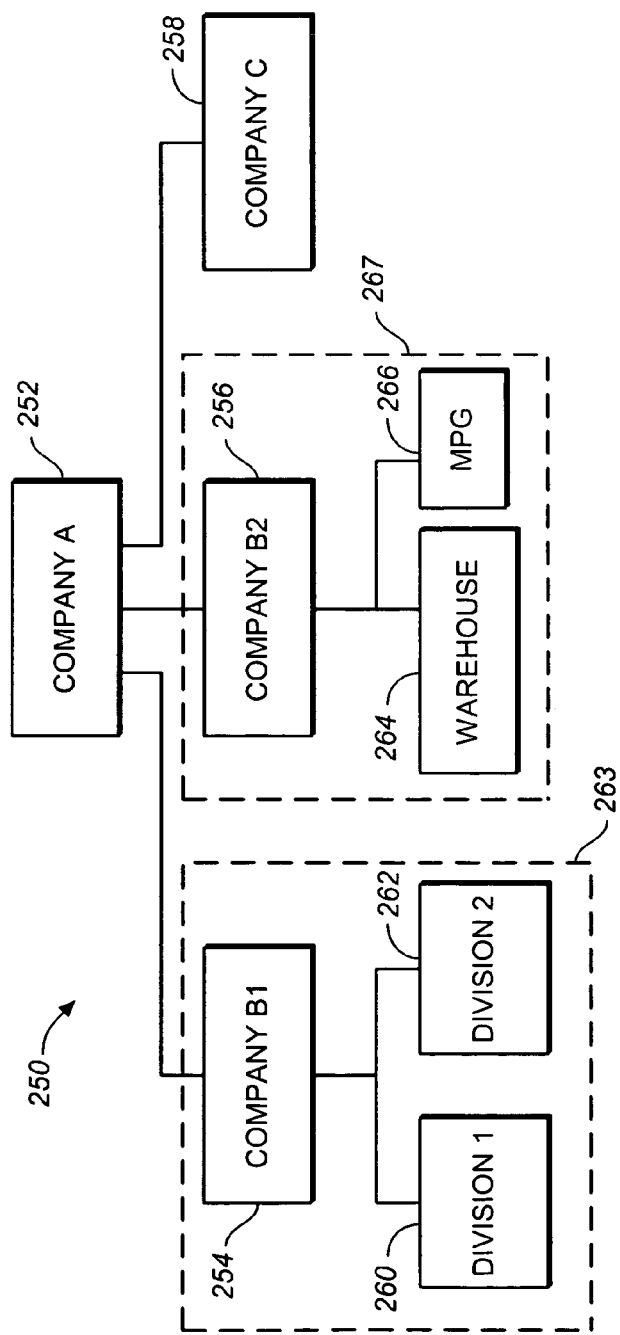
FIG._3
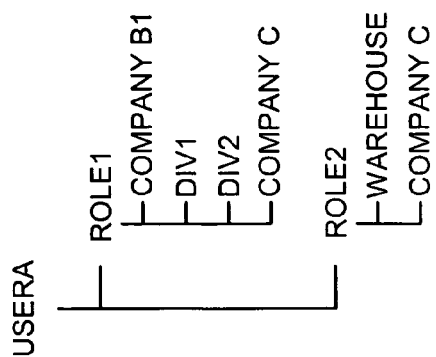
FIG._7

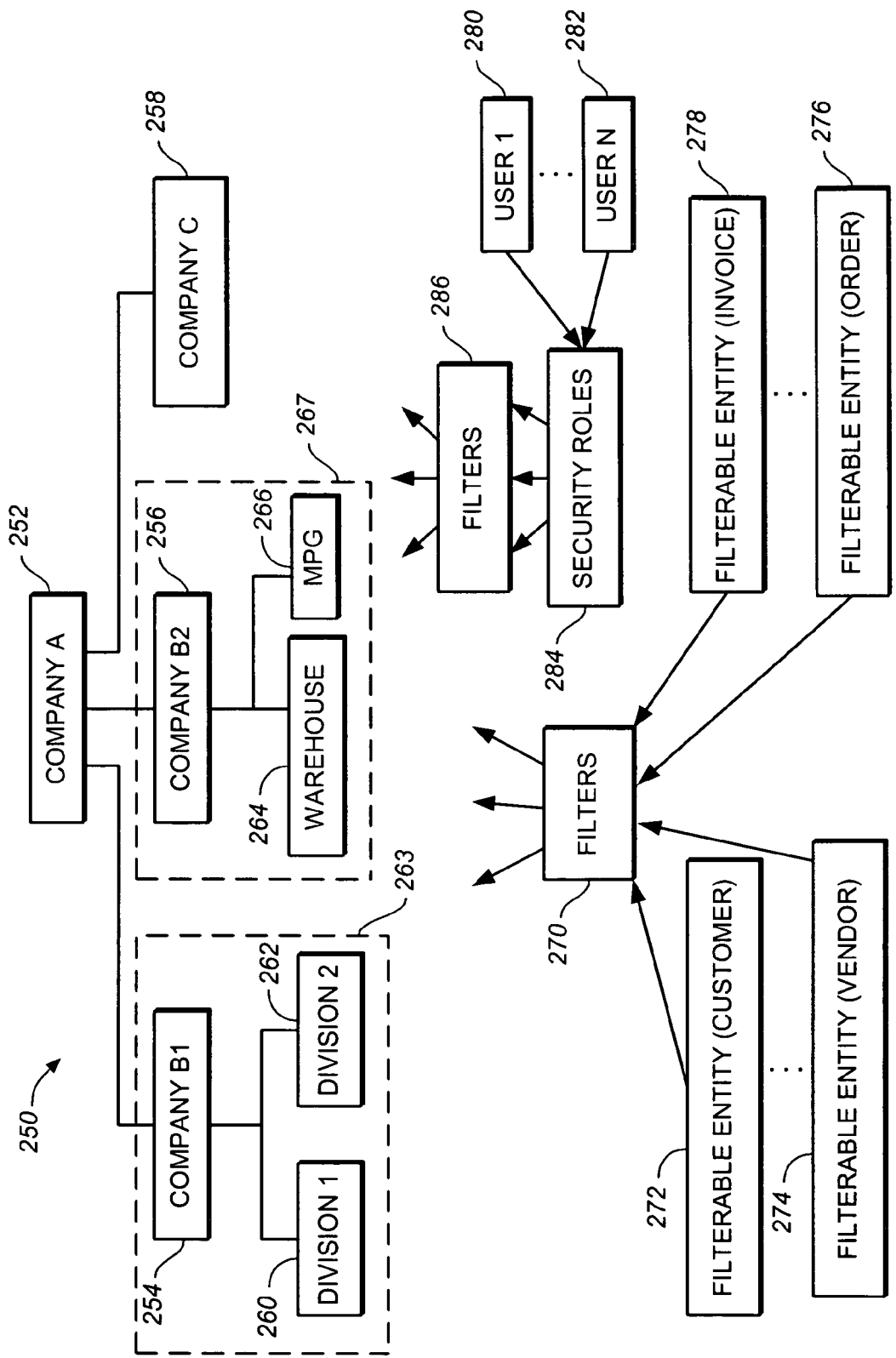
FIG._4

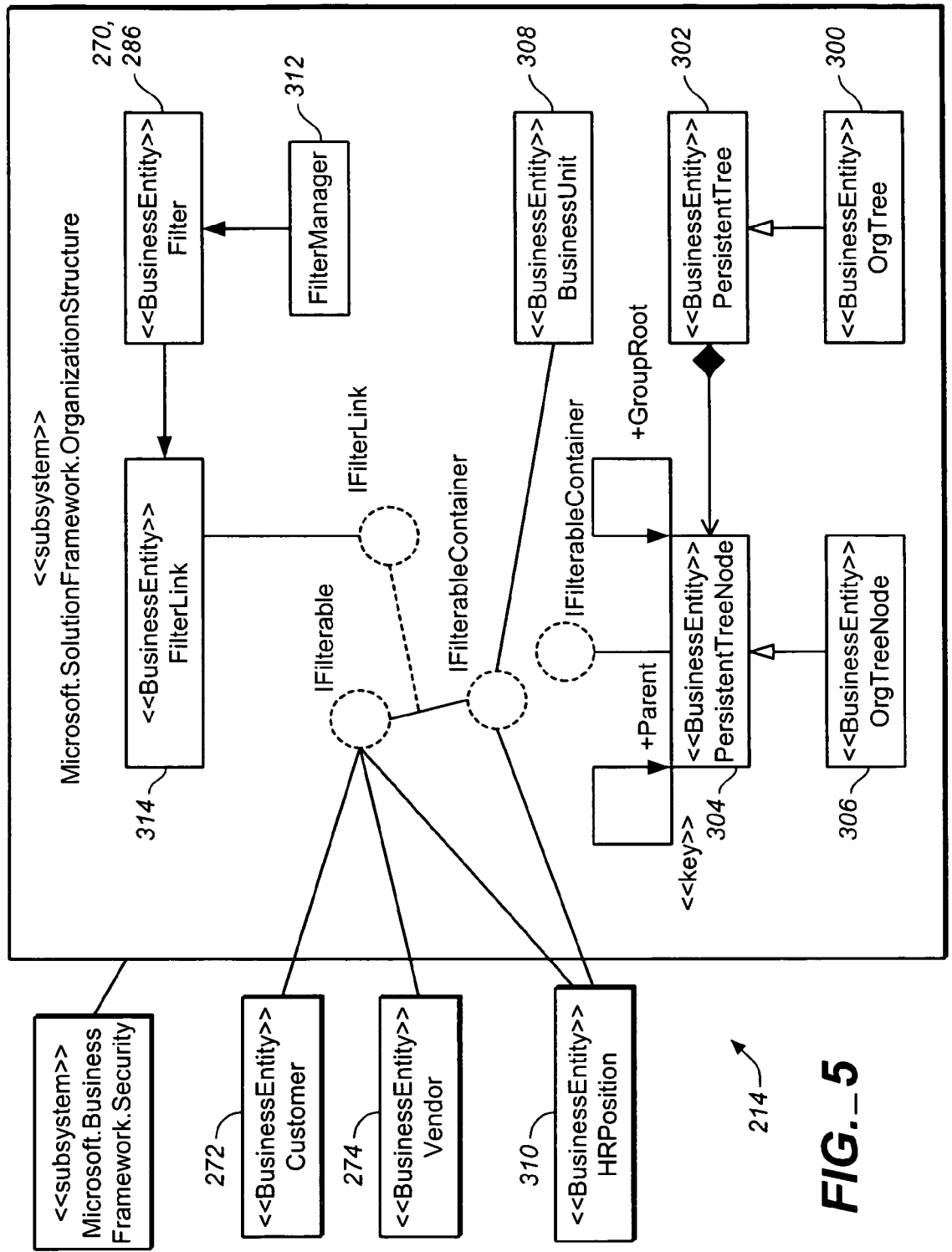
FIG._5

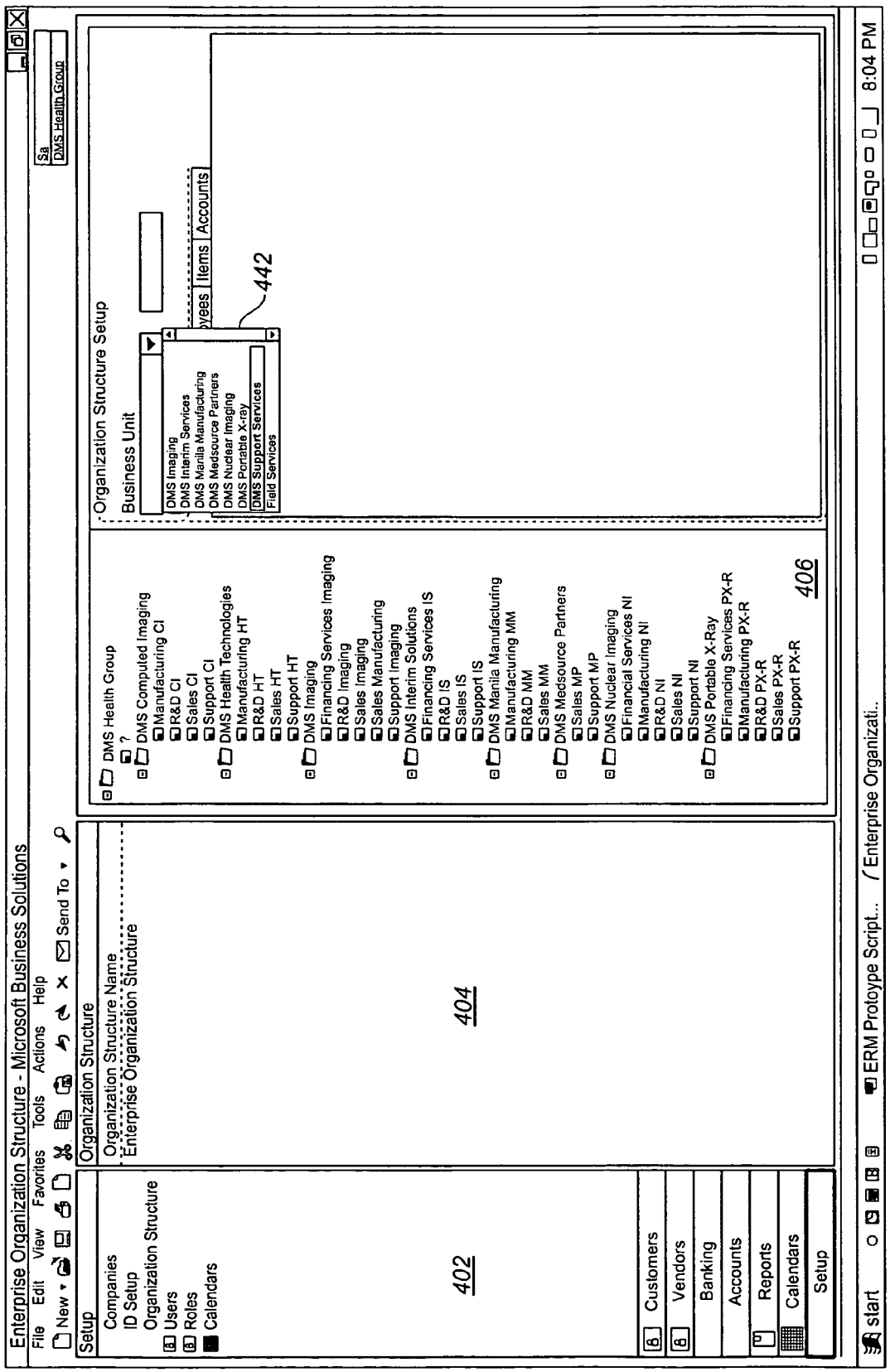
FIG._6B

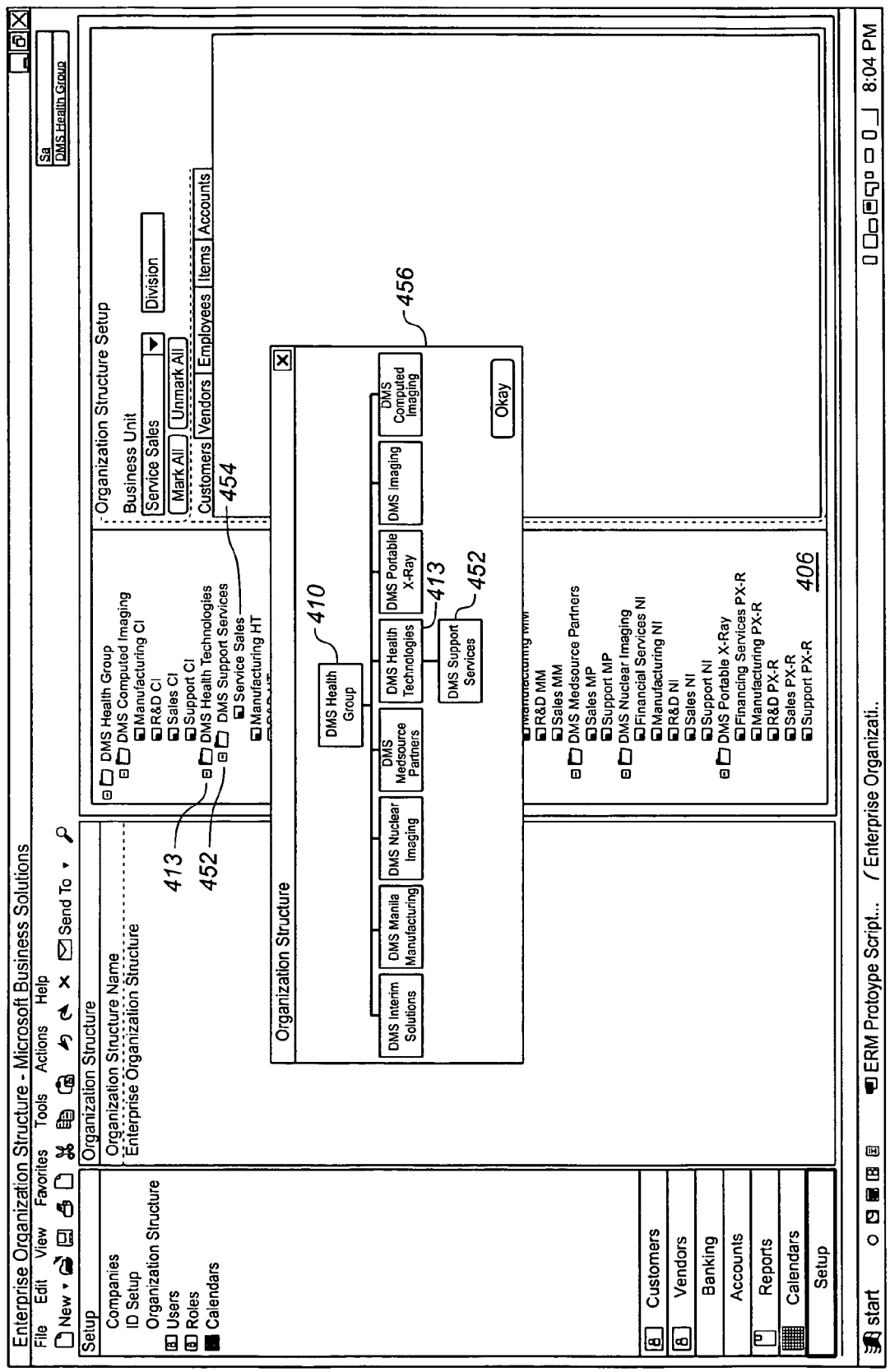
FIG._6C

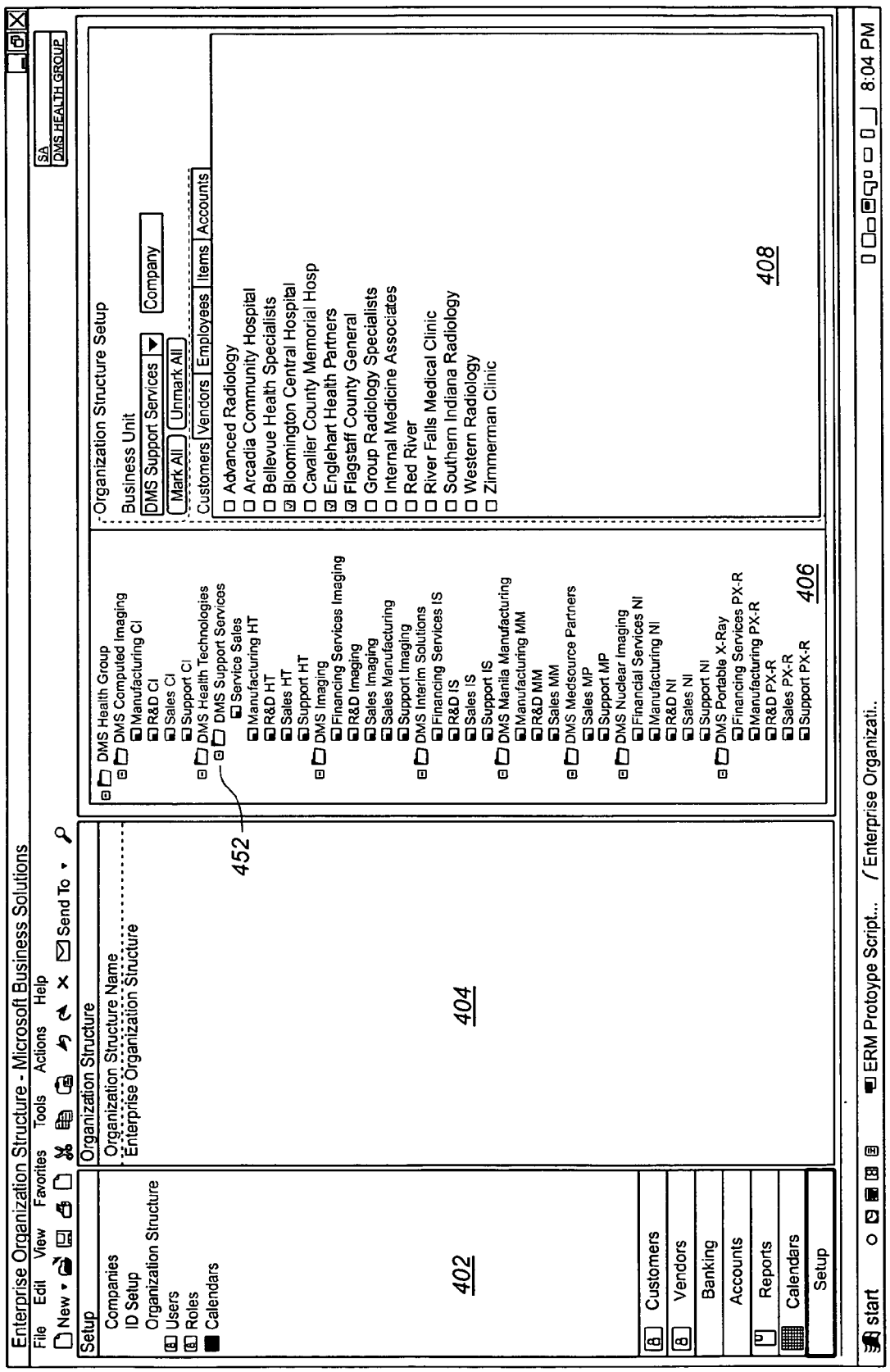
FIG._6D

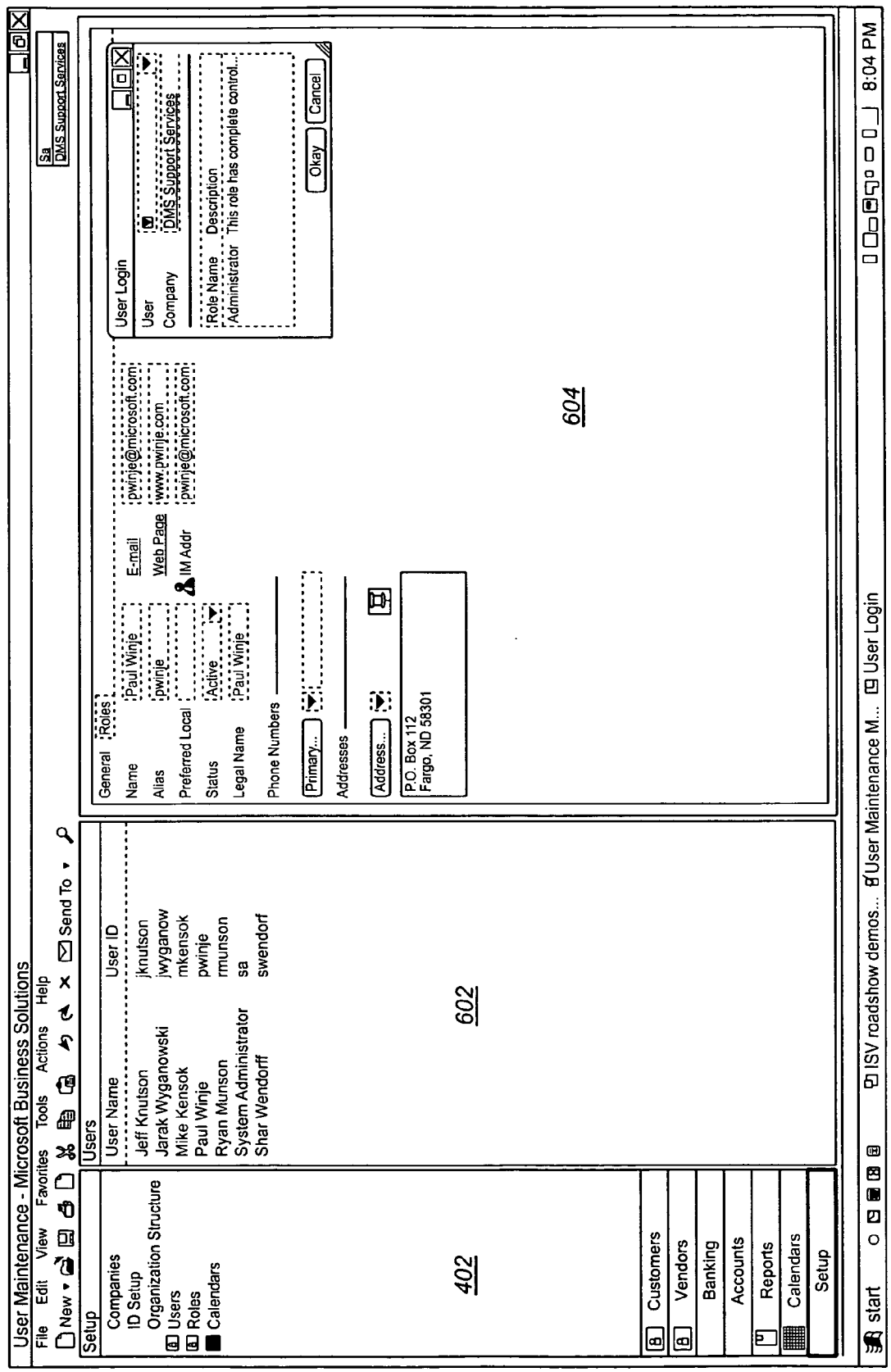
FIG._8A

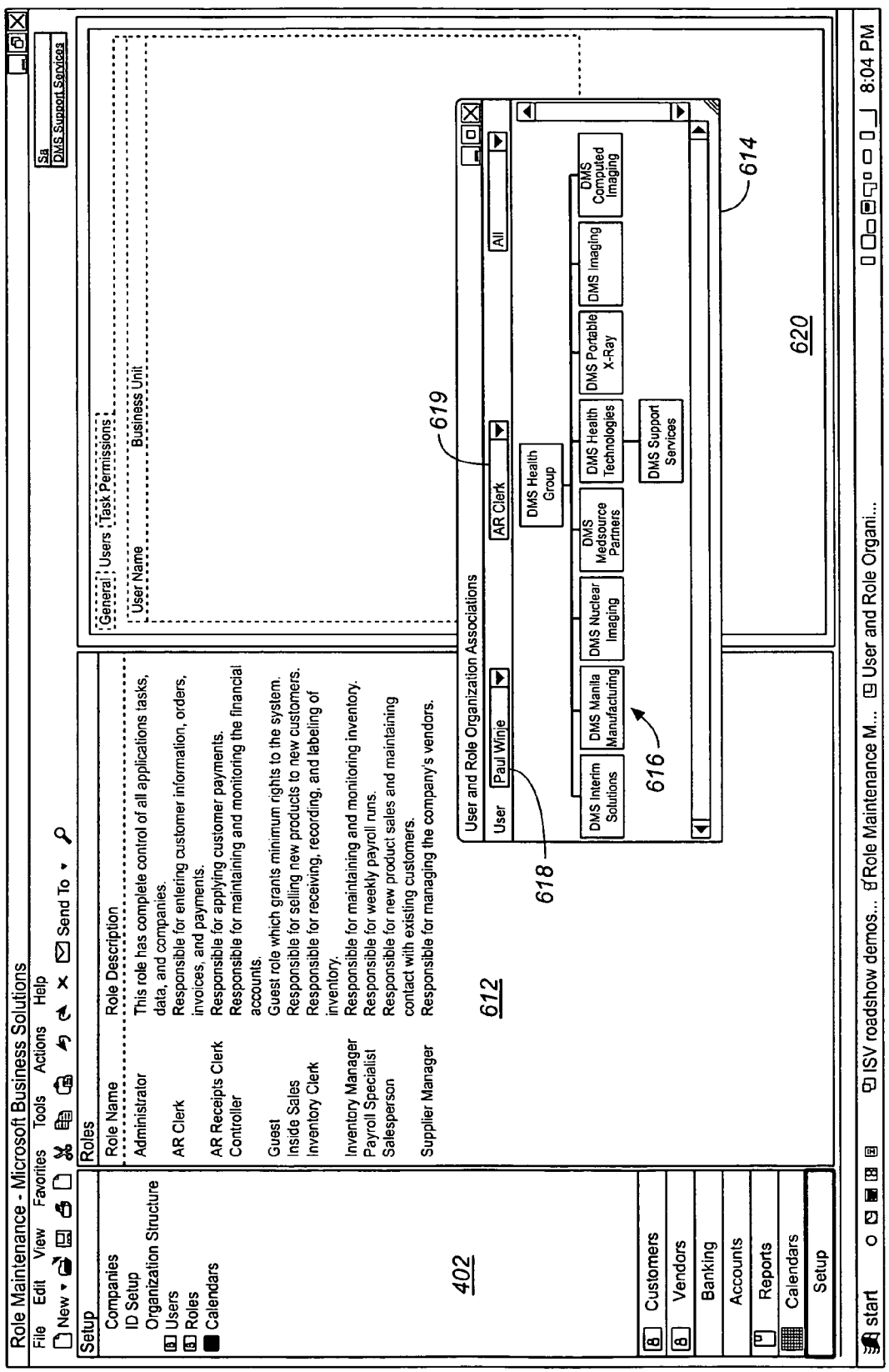
FIG._8B

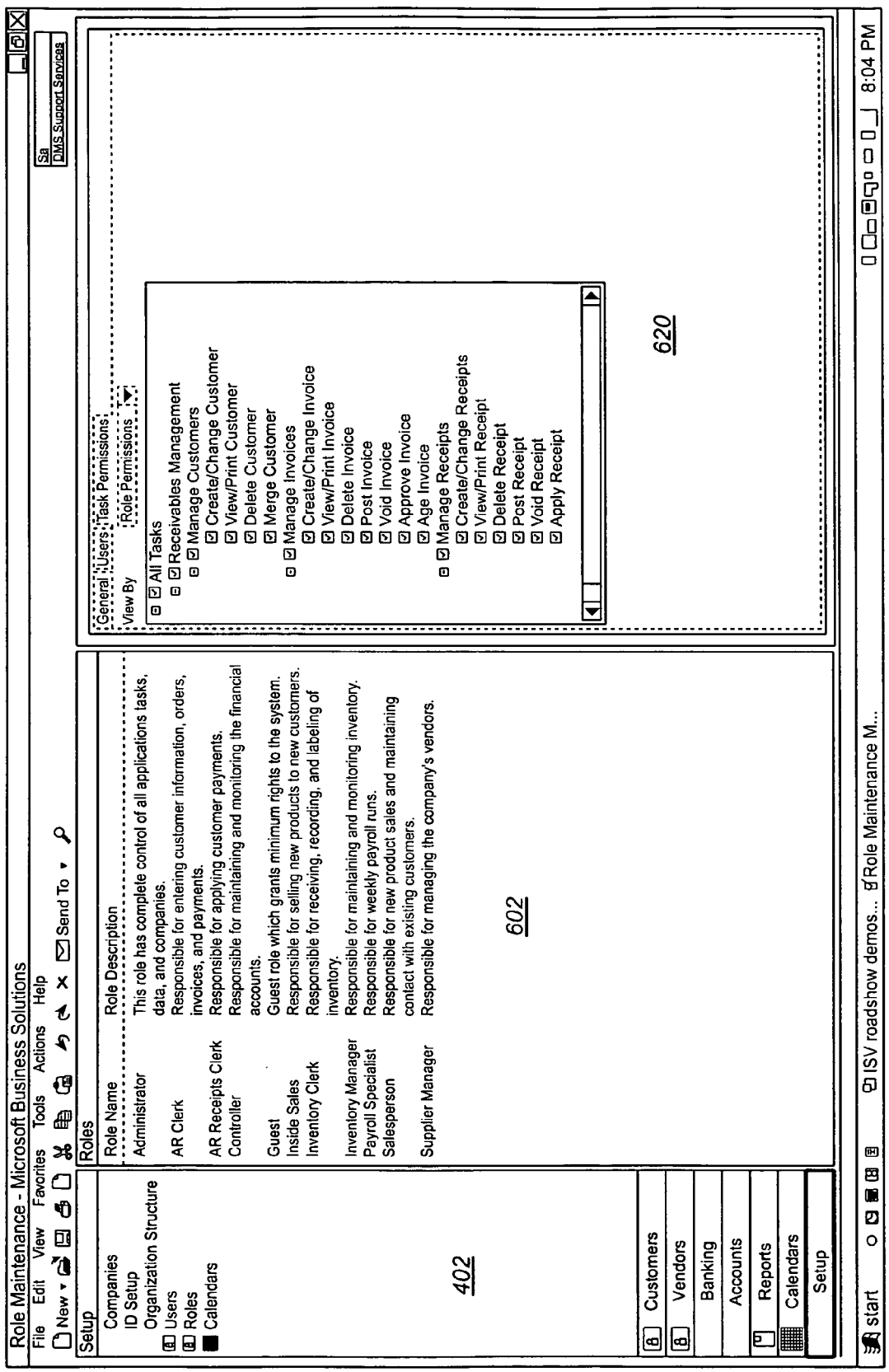
FIG._8C

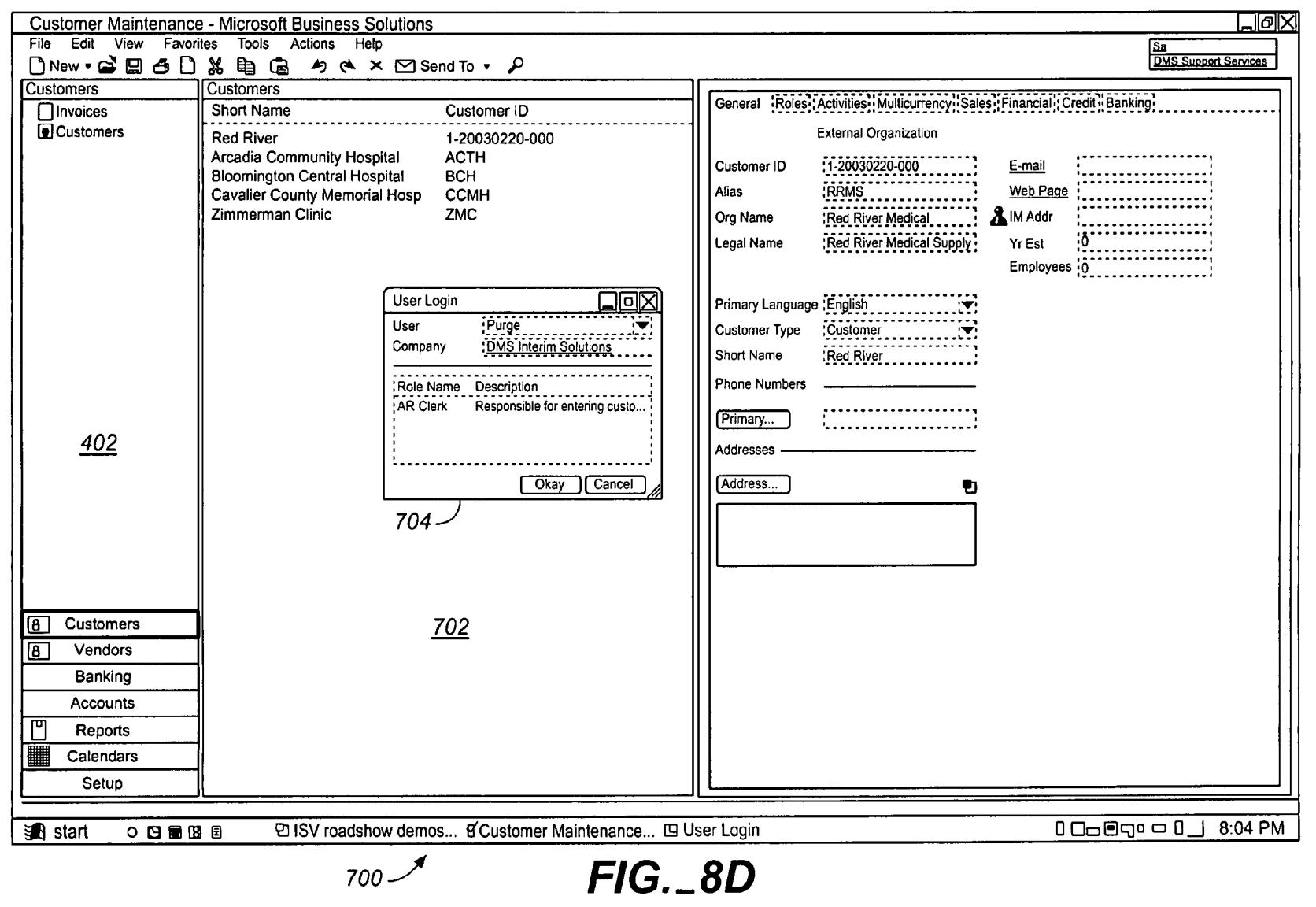

FIG._8D

ORGANIZATION STRUCTURE SYSTEM

The present application is based on and claims the benefit of U.S. provisional patent application Ser. No. 60/454,389, filed Mar. 12, 2003, the content of which is hereby incorporated by reference in its entirety.

BACKGROUND OF THE INVENTION

The present invention relates to software systems for managing businesses. More specifically, the present invention relates to a system that allows a user to model a company structure which includes multiple legal entities, or another structure in any of a wide variety of different ways, and also allows the user to associate users and data to that structure in a flexible way.

Companies currently vary in size from very large and diverse organizations to very small and atomic organizations. However, all are generally hierarchal in nature.

For instance, a larger company may have a head office or headquarters where upper level management or top executives reside.

The company also typically has someone that tracks the flow of money into and out of the company. Depending on company size, this can be a single person or a full department. In addition, some companies track smaller units within the company. Such units may be defined within the company based on function or location, or any other grouping that is logical for the particular company.

Other, smaller companies may be located at just a single geographic location and may have only a small number of employees. Such companies generally have a smaller and less complex organizational structure.

However, regardless of the size of the company, all companies generally have a set of rules that dictate how the company operates. Such companies typically require software applications and software systems to track how well the company is following those rules, and to track a wide variety of other information associated with the company.

In conventional business applications, there are many different ways that the concept of "company" or "enterprise" are implemented. Predominately, in the mid-market, the concept of multiple companies is implemented through a company-to-database ratio of 1:1. This makes it very difficult to perform inter-company transactions. For example, in such an environment, a user that works for multiple different companies must login and logout of different database systems whenever that user wishes to change the company for which she or he is accessing data.

In such systems, two or more companies may desire access to data corresponding to a single business entity or object. For example, a business entity may be setup to represent a given customer, but that same customer may be a customer of both companies, and the companies may, in reality, be two different divisions of the same enterprise. If both of those companies wish to have access to the Customer business entity, this has been handled awkwardly in the past. In one prior system, the customer business entity record must be duplicated and copied into the databases corresponding to both companies. Other software systems allow two or more companies to share a single database. This reduces the requirement for duplicating data, but it has, in the past, required each business entity to be labeled with a company ID that is entitled to access to that business entity. In other words, every record that is shared across different companies must contain identifiers for those companies within the record itself.

These systems have disadvantages in themselves. They either require duplication of data, or they require painstaking manipulation of each business entity to contain company identifiers. However, they present even more disadvantages in today's business environment.

The current business environment is constantly changing. Many businesses must deal with change on a large scale, both internally and externally. Employee turnover, mergers, acquisitions and company reorganizations all require changes to business processes. Very often, the business applications which support those processes must be changed as well.

In prior software systems, changes to the organization structure presented great disadvantages. For instance, if a company is acquired, then data must again be duplicated to accommodate the newly acquired organization. Similarly, in a database system which allows multiple companies to access a single database, the entities corresponding to the newly required company must all be accessed and modified to include the identifier corresponding to the newly acquired organization. It can thus be seen that prior systems require an undesirable amount of labor or data duplication, or both, when there is a change to a corporate organizational structure.

SUMMARY OF THE INVENTION

The present invention is a software system that allows users to model an organizational structure in substantially anyway they wish. The system then provides functionality that allows an administrator to associate users and data to the defined organizational structure, in a flexible way. In one embodiment, an organizational tree component allows the user to configure an organizational tree having nodes corresponding to business units. The business unit nodes are illustratively containers of filters which, themselves, contain filter links. The filter links are links to business entities that are associated with the business unit identified by the node on the organizational tree structure.

In one embodiment, the present invention also provides a user connection system that allows the administrator to associate users with the organizational structure, through a security layer. The user association component allows the users to be assigned a role, and to receive task permissions to access data based on the role, and how the role is associated with the business organization tree structure.

BRIEF DESCRIPTION OF THE DRAWINGS

FIG. 1 is a block diagram of one illustrative environment in which the present invention can be used.

FIG. 2 is a block diagram of an organization structure management subsystem in accordance with one embodiment of the present invention.

FIG. 3 is a block diagram of one illustrative organization structure.

FIG. 4 is a block diagram of how users and data are associated with the organizational structure shown in FIG. 3.

FIG. 5 is a UML diagram of the organization structure and link manager component shown in FIG. 2.

FIGS. 6A-6D are screen shots illustrating how the organizational structure can be changed in accordance with one embodiment of the present invention.

FIG. 7 illustrates how a user can be assigned to various roles in accordance with one embodiment of the present invention.

FIGS. 8A-8D are screen shots further illustrating how a user can be assigned to roles and task permissions in accordance with one embodiment of the present invention.

Figure 6A:
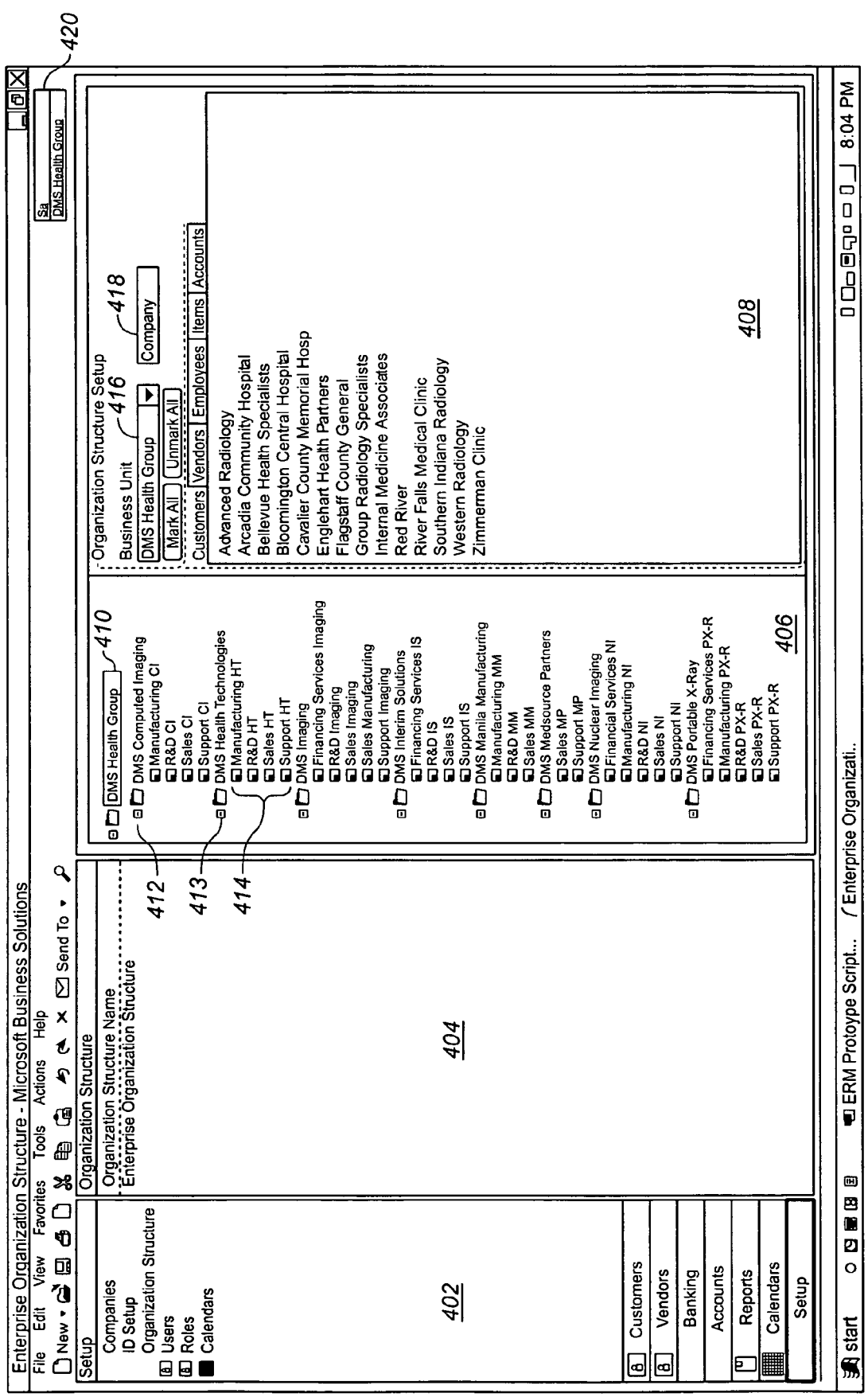

Appendix A specifies programming interfaces for a link management component in accordance with one embodiment of the present invention.

DETAILED DESCRIPTION OF ILLUSTRATIVE EMBODIMENTS

The present invention deals with associating data and users to an organizational structure. More specifically, the present invention provides a system and method for allowing an organizational structure to be configured and changed and to allow data and users to be associated with the organization structure in a flexible way, such that when the organization structure is changed, the data and user associations can be easily changed as well, either automatically or manually. However, before describing the present invention in greater detail, one illustrative embodiment in which the present invention can be used will be discussed.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

FIG. 2 is a block diagram of an organization structure management system 200 in accordance with one illustrative embodiment of the present invention. System 200 shows a user 202 and an administrator 204 interacting with the system through a security subsystem 206. System 200 also illustrates a data store accessing subsystem 208 that stores business data. Subsystem 208 includes data store accessing component 210 and data store 212. Collectively, subsystem 208 can, for example, be implemented as a relational database system, or an object-relational database system, or an object oriented database system or any other suitable storage system. In one illustrative embodiment, data store 212 stores data in relational tables while data store accessing component 210 receives queries to the data store 212 in terms of business entities (or objects) and converts those queries into relational database statements for accessing data in data store 212. However, any other suitable data accessing system 208 can be used as well.

Organization structure management system 200 also shows organization structure and link manager component 214. Administrator 204 illustratively utilizes component 214 to generate an organization structure representative of a desired organization. The administrator then plugs data into that organization structure (or associates data with the organization structure) at a desired level, and also plugs users or roles of users into the organization structure (or associates users or roles with the organization structure) at a desired place in the organization structure. Since component 214 abstracts the associations between the data and the organization structure, and between users or roles and the organization structure away from the data and users themselves, those associations can be quickly and easily created and managed in accordance with the present invention, even though the overall organization structure is changed in some way.

FIG. 2 also illustrates that component 14 is connected to eventing subsystem 216. In one illustrative embodiment, eventing subsystem 216 throws an event when the administrator desires to change the organizational structure. Component 214 is then called to rearrange the associations between the new organizational structure and the data and users or roles, based on the change to the original organizational structure. This is described in greater detail later in the specification.

FIG. 3 is one block diagram illustration of an organizational structure 250 in accordance with one exemplary embodiment of the present invention. It can be seen that structure 250 is formed as a tree having a root designated company A 252 (also referred to as enterprise node 252) with a plurality of additional nodes. It will be appreciated that the present invention can be used to create substantially any organization hierarchy that can be used to define trees for purposes other than modeling company or enterprise organizations. For example, other common hierarchical organization structures that can be defined by the present invention include, without limitation, human resource position hierarchies, territory hierarchies, national account hierarchies, invoice approval hierarchies, etc. The hierarchy can be used alone or along with the filters discussed herein. However, for the sake of clarity, the present discussion proceeds only with respect to a company organization structure with filterable links. The additional nodes include companies B1 and B2 and company C, along with divisions 1 and 2 of company B1 and a warehouse and manufacturing component of company B2. The nodes are designated by numerals 254-256, 258, 260, 262, 264 and 266.

Before describing organizational structure 250 in greater detail, a number of items corresponding to tree structure 250 will be described. The first is that structure 250 as discussed above, is illustratively formed as a hierarchical tree structure of organization tree nodes. Each node comprises a filterable container referred to as a business unit. The business units can be generated in the organizational tree structure 250 based on any desired criteria, such as based on the functions performed within an enterprise company (e.g. company A represented by node 252), based on how teams are arranged within the company, based on physical locations of facilities within the company, or based on any other desired criteria. It will be noted that, in accordance with one embodiment, one business unit is represented by each node in tree structure 250.

A single business unit can be assigned to one or many other nodes in one or many other tree structures 250. In other words, if division 2 of company B1 performed marketing functions for company B1, but also performed invoicing functions for company B2, business unit 262 could be associated through its node with both company B1 254 and company B2 256.

It will also be noted, in one illustrative embodiment, multiple business units can depend from a single business unit. Each business unit, as discussed above, comprises a filterable container that has filterable entities attached to it. The filterable entities comprise business entities, such as objects representative of customers, employees, budgets, invoices, etc.

The attachment of the filterable entities to the business units referenced by nodes in tree 250 is implemented by a filter. Each filter illustratively comprises a set of filter links. The containers attached to filter links tie the nodes of tree 250 (i.e., the filterable containers, in the organizational tree structure 250) to the filterable business entities. This is described below with respect to FIG. 4. However, it should simply be noted at this point that once the organizational tree structure 250 is built, a set of business unit nodes can also be identified as a company group. It can be seen that the set of business units 254, 260 and 262 form a company group 263, while the business units 256, 264 and 266 form another company group 267. Therefore, not only are the nodes in tree 250 identified by the administrator as business units, but collections of those nodes can also be identified as company groups.

Each business unit is labeled with a functional category. Company groups in tree 250 may be referred to herein as legal entities. In one illustrative embodiment, a legal entity is any business unit that has been given a functional category of company, for example, a company group root. Other business units within that company group are defined based on a different functional category.

Once the organizational tree structure 250 is built, data and users are associated with that tree structure 250 at desired locations within the tree structure 250. FIG. 4 is a block diagram illustrating the process of associating data and users to the tree structure 250 shown in FIG. 3.

FIG. 4 shows that the data (the business entities) are associated with business units represented by nodes in tree structure 250 through filters 270. FIG. 4 specifically shows that filterable business entities representative of customers, vendors, invoices and orders, and referred to by designation numerals 272, 274, 276 and 278, are all associated with tree structure 250 through a set of filters 270. In the embodiment illustrated, filters 270 can associate business entities 272-278 with tree structure 250 at different levels. If the filter 270 associates a business entity 272-278 with hierarchical structure 250 at the enterprise level, then it associates that business entity with the entire tree structure 250. This can be done in a number of different ways such as by marking the business entity as being non-filterable. This means that anyone that has access within the tree structure 250, to data associated with any node in tree structure 250, will have access to the business entity associated at the enterprise level. Therefore, such a business entity is truly a shared record, shared across the entire enterprise.

However, filters 270 can associate a business entity at the company group level. Therefore, for instance, a filter 270 can associate a business entity (such as customer business entity 272) only with company group 263. In that case, any user that has access to company group 263 will be able to access that record. However, users that only have access at the enterprise level, or with different company groups (such as company group 267) or with only nodes within other company groups, other than company group 263, will not have access to such a record.

Similarly, filters 270 can associate business entities at the business unit level. In that case, the business entities are associated with a given business unit node within hierarchical tree structure 250. Therefore, only users that have access to data associated with that given node will have access to the business entity. Of course, if a business entity is associated by a filter 270 with company group B1, for example, then all users that have access to company group B1 data through division nodes 260 and 262 will be able to access the data associated with the company group B1 as well. However, if, for example, a business entity is associated only with an individual business unit node 260, then even users that have access within company group 263, but not specifically to data associated with node 260, will not have access to the information.

The data (business entities 272-278) thus associated with hierarchical tree structure 250, are said to be filterable on their level of association. Thus, those business entities associated at the enterprise level are said to be filterable at the enterprise level. Those business entities associated with a company group (such as company group 263 or 267) are said to be filterable at the company group level. Those business entities associated with a business unit are said to be filterable at the business unit level. It will, of course, be appreciated that business entities can illustratively be associated at a plurality of different levels within hierarchical tree structure 250 or they can be associated at multiple places at a single level (such as being associated with multiple individual business units within tree structure 250). Therefore, each business entity associated with tree structure 250 will be filterable at any combination, or at all, of the filter levels discussed above.

Having assigned data to the hierarchical tree structure 250, users can now be assigned to tree structure 250. In one illustrative embodiment, the component 214 (shown in FIG. 2) can be used to assign individual users 280 and 282 (identified as users 1-n) to one or more roles 284. In one illustrative embodiment, a given role carries with it a group of task permissions. The task permissions, in turn, correspond to a set of filters 286 that are formed by filter links which link a role to tree structure 250. Thus, each role defines what data a user assigned to that role can view based on where the role is linked into hierarchal tree structure 250, and based on where the data is linked into the tree structure as described above.

For example, assume that a role has been defined which is referred to as the CEO role for company B1. That role would likely be linked to the company group 263 in FIG. 250. This would allow a user having that given role to have access to all data associated with company group 263. Of course, since the data associated at the enterprise level (associated with company A at node 252) is shared across all business units, the user having the "CEO of company B1" role would also have access to data associated to tree structure 250 at the enterprise level. However, if that given role was only associated with company group 263 by filters 286, then the user having the "CEO of company B1" role would not have access to any other data that was only associated within company group 267, or to company C 258.

It can thus be seen that the data (represented by business entities 272-278) and the users (through roles 284) are associated with hierarchical tree structure 250 through filters 270 and 286. In an illustrative embodiment, management and maintenance of filters 270 and 286 is performed using organization structure and link manager component 214. Therefore, the links to tree structure 250 are abstracted away from the objects representing users 280-282 and business entities 272-278. Hence, in accordance with one embodiment, when changes are made to the organizational tree structure 250, all of the individual entities representing data (entities 272-278) and those entities representing users (entities 280-282) or roles 284, need not be accessed and modified. Instead, the filters 270 and 276 are all that need to be modified to accommodate the changes in the hierarchical tree structure 250. This can be done in accordance with the present invention in one of a variety of different ways, either automatically or manually, while still preserving the flexibility and convenience in accordance with the present invention.

In one illustrative embodiment, when the administrator interacts with component 214 to change the structure of hierarchical tree structure 250, component 214 generates a display of all affected filterable entities. For instance, if the administrator wishes to merge division 2 262 into division 1 260 in company B1, then component 214 generates a display of all filterable entities associated with division 2 262. The display illustratively allows the administrator to quickly reassign associations of those filterable entities to different nodes within tree structure 250, as the administrator desires.

However, in accordance with another embodiment, the changes of the associations are made automatically. For instance, component 214 can be provided with access to different sets of rules that apply when different operations are taken to modify an organizational structure (such as tree structure 250). One illustrative set of rules will indicate that, when two divisions within a company group are being merged, all associations with the merged business unit are moved to the parent of that division. For instance, if the administrator provides an input indicating that division 2 262 is to be merged with division 1 260 of company B1, then all of the data and user roles associated with division 2 262 are automatically moved so that they are now associated with company B1 254. Of course, any other set of rules can apply as well. For instance, the associations may simply be moved to the business unit division 1 260 into which the business unit division 2 262 is being merged.

Similarly, the rules that apply can be applied on an individual business entity basis, or on an individual business unit basis. In one illustrative embodiment, when the administrator 204 provides an input indicating a change to organizational structure 250, eventing system 216 fires an event and all business entities or business units subscribing to that event perform necessary processes. For instance, if business unit division 2 262 subscribes to such an event, it can hand component 214 a process for handling its associations. That process will illustratively set out the rules which component 214 is to follow in reassigning the associations from division 2 262 to another business unit or company group within hierarchical tree structure 250, when division 2 262 is merged.

In any case, it can be seen that component 214 abstracts away from the business entities and user entities their associations with the organizational structure 250. Thus, those associations can be quickly and easily handled, without accessing all of the data records corresponding to the business entities and user entities, when the hierarchical structure 250 changes. This is highly advantageous over prior systems which required modification to every business entity or user entity affected by such a change, or which required large amounts of duplicate data to be created or deleted when changes to the organizational structure 250 where made.

FIG. 5 is one illustrative UML diagram of organizational structure and link manager component 214 in accordance with one embodiment of the present invention. The lower portion of FIG. 5 defines the organizational tree structure while the upper portion defines how filters are managed. The lower portion indicates that organizational tree business entity 300 is a persistent tree entity 302. Persistent tree entity 302 can have one or many persistent tree nodes 304 associated therewith and each organization tree node (such as the nodes shown in FIG. 3 and represented by entity 306) is a persistent tree node. The diagram also indicates that the persistent tree node contains an identifier corresponding to the group root node (such as the enterprise node 252 in FIG. 3) and a parent ID which identifies the parent node of the present organizational tree node.

FIG. 5 also illustrates that each tree node, and each business unit 308, implements an IFilterableContainer interface and that the individual business entities (such as business entities 272-278 in FIG. 4) implement an IFilterable interface. Filter manager 312 is illustratively a component that performs most of the functionality of organizational structure and link manager component 214. FIG. 5 also shows that each filter 270, 286 is illustratively a business entity that contains one or more filter links represented by 314 in FIG. 5. Each filter link also implements an IFilter link interface. The specific interfaces described with reference to FIG. 5 are specified in greater detail in Appendix A hereto.

Thus, it can be seen that FIG. 5 shows that each node in tree 250 has a business unit attached to it, and each business unit is a filterable container that contains links to filterable entities. The entities illustrated in FIG. 5 are the customer entity 272, the vendor entity 274 and an HR position entity 310. The persistent tree entity 302 is a base class for all other trees. It implements all important tree operations. The operations are performed on a set of tree nodes 304 owned by a given tree. The composition of a tree and its nodes is illustratively managed by a separate cache object that encapsulates collections of nodes and also provides memory caching capabilities. This forms no part of the present invention, however, and is not discussed further.

The org tree entity 300 supports grouping and filtering and thus when it is modified, it automatically generates operations needed to update related filters. The IFilterLink links filterable entities with filterable container entities. It is the base interface for any class that implements filter links. IFilterLink implements a filter link between IFilterable and IFilterableContainer interfaces and therefore is capable of linking any filterable entity with any filterable container entity.

The filter manager class 312 is the only class that a programmer needs to interact with when programming tasks involving filtering. Filter manager 312 illustratively contains a collection of all filters within an application. This collection is materialized in cache (in one embodiment, just the filter headers and not the actual filter links) in a constructer of the filter manager class. Each filter encapsulates a collection of filter links 314.

One exemplary embodiment of a user interface for generating the hierarchical tree structure and associating data with it is now discussed with respect to FIGS. 6A-6D. FIG. 6A shows an illustrative user interface display 400 generated when an administrator 204 interacts with component 314 in a setup mode. The screen 400 includes a setup pane 402, an organization structure pane 404, an organization tree structure pane 406, and a filtered data pane 408.

The setup pane 402 allows a user to select different modes of operation (such as setup) and then to select different operations, such as companies, setting up of IDs, modifying organizational structures, modifying users, roles, and various other operations. Screen 400 shows that the user is in setup mode and has selected organization structures.

Given this, the organization structure identified is set out in organization structure pane 404, and its current organization tree structure is set out in pane 406. The very top node 410 in tree structure 406 is illustratively the enterprise node while the sub nodes immediately beneath 410 correspond illustratively to company groups 412. Underneath the company groups are sets of nodes 414 that correspond to the business units within that company group.

By highlighting one of the nodes in tree structure 406, all the data items filtered based on that node appear in pane 408. Also, in the upper portion of pane 408, the organizational structure setup information is provided which provides the name of the business unit in pane 416, and the functional category assigned to that business unit is shown in field 418. The organization tree structure can also illustratively be displayed graphically by selecting the graphical indicator 420 in the upper right hand corner of display 400.

FIG. 6B shows display 440 which is slightly modified from that shown in FIG. 6A, because the administrator in FIG. 6B is now attempting to add a legal entity to the organizational tree structure 406. In order to do this, the administrator illustratively selects a node in organizational tree structure 406 and provides an input (such as a right click) on that selected node. This illustratively brings up a drop down menu, or another type of selectable menu, which allows the administrator to choose an "Add Child Business Unit" function. When this happens, drop down menu 442 is provided to the administrator.

Menu 442 lists all business units that were previously setup by the administrator. Therefore, assume that the business represented by organizational tree structure 406 has grown and the administrator wishes to add a company or business unit to tree structure 406. The administrator simply selects the place in tree structure 406 where the administrator desires to add the business unit, right clicks on that place and is provided with the previously setup business units that can be added in pane 442. By selecting one of the business units in pane 442, it will automatically be placed within the tree structure beneath the selected node. Alternatively, of course, the selected business unit from pane 442 can be dragged and dropped to a desired place in tree structure 406 as well. It can be seen that the business unit "DMS Support Services" has been selected from pane 442.

FIG. 6C illustrates a display 450 that shows organizational structure 406, once it has been modified. Organizational structure 406 now shows DMS Support Service node 452 below DMS Health Technologies node 413, where it had not been placed there before. Screen shot 450 also shows that a child business unit "Sales Service" node 454 has been added beneath business unit node 452 as well.

FIG. 6C also illustrates one optional embodiment in accordance with the present invention. Once the organizational structure 406 has been modified, it can optionally be graphically displayed, (such as in pane 456) to the administrator so that the administrator can more easily visualize the organizational structure. Pane 456 shows the structure down to the company level only, so that it shows node 452 having been attached to node 413, but it does not show the child business unit node that was attached to node 452. Of course, the child node could be shown as well, if desired.

FIG. 6D illustrates screen shot 470 which shows that, the DMS Support Services node 452 is highlighted on tree structure 406, all of the filter associations now corresponding to that node 452 are displayed in filter data pane 408. In another illustrative embodiment, of course, all of the filter associations that are affected by the addition of node 452 can illustratively be displayed in pane 408. In that embodiment, the user can actively select which filter associations are to be applied to the new node. Other functionality can be provided as well. For instance, the "Mark All" button can be used to mark all of the filter associations and they will automatically all be applied to the new node, without any additional data entry.

It has thus been shown how data has been associated to an organizational tree structure, that structure has changed, and the data associations were correspondingly changed. Now, users are associated with the organizational tree structure.

FIG. 7 is a tree structure which illustrates how roles can be assigned to users. FIG. 7 illustrates that a user (designated user A) is assigned to two different roles (roles 1 and 2). Role 1 associates the user with company B1, division 1, division 2 and company C, while role 2 associates the user with the warehouse and company C business units in FIG. 4. FIG. 7 thus illustrates that a user can be assigned to a single role across multiple companies or business units. This is illustrated by role 1 which is across different companies and business units. FIG. 7 also shows that the user can be assigned to multiple roles across multiple companies and business units. For instance, user A is assigned to both roles 1 and 2 which extend across different companies and business units. FIG. 7 further shows that a user can be assigned to multiple roles across a single company. For instance, both roles 1 and 2 extend to company C.

FIGS. 8A-8D better illustrate how a user is assigned to a role and how the roles are associated with the organizational tree structure. FIG. 8A shows a screen shot 600 that is similar to that shown in FIG. 6A except that, in pane 402, the user has now highlighted the "Users" selection. Therefore, pane 602 shows all of the users which the administrator has created or setup. When the administrator highlights one of the users in pane 602, the user information associated with that user is displayed in pane 604.

FIG. 8B is a screen shot 610 which shows how a role is added for a given user. Again, in pane 402, the administrator has now selected the "roles" selection such that pane 612 shows all available roles. When the administrator selects one of the roles (such as "AR Clerk"), then pane 614 is displayed and allows the administrator to define for which business units in the organization structure (illustrated by tree structure 616) the user will be assigned those roles. Field 618 identifies the user under consideration.

The administrator can illustratively select one or more of the business units displayed in tree structure 616. In that case, the selected business units will be those business units for which the user identified in field 618 will have the role identified in the role field 619.

Pane 620 is also displayed. If the selected user has any current roles, they will be displayed in pane 620. However, in the embodiment shown in FIG. 8B, the user has not been provided with any roles as yet, so none are displayed.

FIG. 8C illustrates that the roles are ways of grouping task permissions and assigning them to a user. The screen shot 650 in FIG. 8C is similar to that shown in FIG. 8B, except that instead of selecting the "Users" tab in pane 620, the administrator has selected the "Task Permissions" tab. Thus, pane 620 displays all permissions for the role that is selected in pane 602. In the embodiment illustrated, the selected role is the "AR clerk" role. Pane 620 also allows the administrator to check or uncheck any of the task permissions so that they will or will not be associated with the selected role.

FIG. 8D is a screen shot 700 which shows that the administrator has now logged into the system as the user which has just been associated with a role. Therefore, in pane 402, the administrator has selected the "Customers" option and all the customers for the "DMS Interim Solutions" business unit are displayed in pane 702. The login screen 704 displays the user name, the functional company name for the business unit corresponding to the user, and all of the roles which the user has been assigned for that company.

It can thus be seen that the present invention provides significant advantages over prior art systems. The present invention provides a system by which an administrator can configure a business unit organization structure and then assign data and users to designated spots in that structure, quickly, easily and efficiently. Similarly, the present invention allows an administrator to change the organization structure and thus change the data associations and user associations in a quick and efficient manner. By abstracting the associations between the data and users and the organization structure, this can all be done with a very low amount of data entry, or it can be done automatically, as desired.

Although the present invention has been described with reference to particular embodiments, workers skilled in the art will recognize that changes may be made in form and detail without departing from the spirit and scope of the invention.

What is claimed is:

1. A computer implemented method of configuring organization data related to an organization for access by a user, comprising:
    obtaining organization structure information that defines of connected nodes, each node representing a business unit, each business unit being a part of defining how the business units are related to each other based on how the nodes are connected to one another in the organization structure, wherein organization structure information comprises an organization structure name and enterprise organization structure;
    obtaining data entity information that defines data entities that represent the business data related to the organization;
    generating links, separate from the data entities, linking the data entities to the nodes in the organization structure, wherein each node comprises a link container configured to include one or more links to data entities, and wherein generating links comprises providing one or more links to data entities in the link container;
    grouping a plurality of nodes into a node group, each node group comprising a group link container configured to include one or more links to the data entities, and wherein generating links further comprises providing one or more links to the data entities in the group link container; and
    controlling whether the user has access to the data entities based on the links, wherein controlling whether the user has access comprises associating user roles with the nodes and group nodes, and further comprises assigning the user to a user role, and further comprises filtering the user access to data entities linked to nodes that are associated with the user role to which the user is assigned, wherein the user role corresponds to a task permission, and wherein the task permission corresponds to a filter, and wherein filtering the user access to data entities comprises filtering based on the filter.

2. The method of claim 1 wherein obtaining organization structure information comprises:
    generating the organization structure information as a tree structure.

3. The method of claim 2 and further comprising: changing the tree structure; and modifying the links to link the data entities to the changed tree structure.

4. The method of claim 3 wherein changing the tree structure affects nodes in the tree structure and wherein modifying the links comprises:
    automatically transferring links from the affected nodes to other nodes in the tree structure.

5. The method of claim 3 wherein changing the tree structure affects nodes in the tree structure and wherein modifying the links comprises:
    presenting links in the affected nodes for manual modification.

6. A system for relating data, corresponding to an organization, to an organization structure indicative of a structure of the organization, the system comprising:
    an organization structure generator component, configured to generate the organization structure with a plurality of connected nodes, each node representing a business unit, each business unit being part of the organization, wherein the organization structure comprises an organization structure name and enterprise organization structure;
    a link manager component configured to generate a link between a given business unit of the organization represented by a given node in the organization structure and an entity representative of business data corresponding to the organization by generating the link between the given node and the entity, wherein each node comprises a link container and wherein the link manager is configured to generate the link between the given unit and the entity by placing the link in the link container represented by the given node;
    a user role manager component configured to assign a user role to a user, wherein the user role manager component is configured to link each role to nodes in the organization structure through containers associated with those nodes wherein the user role corresponds to a task permission, and wherein the task permission corresponds to a filter; and
    a filtering layer configured to filter user access to entities based on the user's user role and the links, and wherein the filtering layer filters user access to data entities based on the filter.

7. The system of claim 6 wherein the link manager is configured to automatically modify links in the link containers according to a predetermined process based on changes to the organization structure.

8. The system of claim 6 wherein changes to the organization structure affect nodes, and wherein the link manager is configured to display links in the link containers corresponding to the affected nodes for manual modification based on the changes to the organization structure.

* * * * *